(12) United States Patent
Arbuckle et al.

(10) Patent No.: US 8,694,248 B1
(45) Date of Patent: Apr. 8, 2014

(54) SYSTEMS AND METHODS OF MONITORING THE ACCURACY OF A GLOBAL POSITIONING SYSTEM RECEIVER IN A MARINE VESSEL (75) Inventors: Jason S. Arbuckle, Horicon, WI (US); William R. Robertson, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 579 days.

(21) Appl. No.: 13/023,304

(22) Filed: Feb. 8, 2011

(51) Int. Cl.
G01C 21/00 (2006.01)
G01R 29/26 (2006.01)
H04B 17/00 (2006.01)

(52) U.S. Cl.
USPC ............. 701/468; 701/469; 701/495; 702/69; 398/26; 455/135; 455/226.2; 455/226.3

(58) Field of Classification Search
USPC ....... 701/468–491; 702/69; 398/26; 455/135, 455/226.2, 226.3; 342/357.22, 357.24
See application file for complete search history.

(56) References Cited

U.S. PATENT DOCUMENTS

| 5,451,964 | A | 9/1995 | Babu |
| 5,736,962 | A | 4/1998 | Tendler |
| 6,121,923 | A | 9/2000 | King |
| 6,273,771 | B1 | 8/2001 | Buckley et al. |
| 6,407,701 | B2 | 6/2002 | Ito et al. |
| 6,485,341 | B1 | 11/2002 | Lanyi et al. |
| 6,559,793 | B1 | 5/2003 | Eschenbach |
| 6,727,848 | B2 | 4/2004 | Eschenbach |
| 6,775,615 | B2 | 8/2004 | Yule |
| 6,842,715 | B1 * | 1/2005 | Gaal ............................ 702/152 |
| 6,885,919 | B1 | 4/2005 | Wyant et al. |
| 7,267,068 | B2 * | 9/2007 | Bradley et al. ............ 114/144 R |
| 7,305,928 | B2 | 12/2007 | Bradley et al. |
| 7,446,700 | B2 | 11/2008 | Yu et al. |
| 7,577,526 | B2 | 8/2009 | Kim et al. |
| 2006/0069505 | A1 * | 3/2006 | Sweetapple .................... 701/214 |
| 2007/0025287 | A1 * | 2/2007 | Goren et al. ................... 370/328 |
| 2009/0325592 | A1 * | 12/2009 | Jang et al. .................. 455/456.1 |
| 2010/0198442 | A1 * | 8/2010 | Appelman et al. .............. 701/25 |

* cited by examiner

Primary Examiner — Fadey Jabr
Assistant Examiner — Thomas Ingram
(74) Attorney, Agent, or Firm — Andrus Intellectual Property Law, LLP (57) ABSTRACT Systems and methods for monitoring the accuracy of a global positioning system (GPS) receiver in a marine vessel utilize a GPS receiver receiving a plurality of satellite signals, calculating a global position of the GPS receiver based on the plurality of signals, and determining a signal to noise ratio (SNR) of each signal in the plurality of signals; and a control circuit having a computer readable medium having executable code, and being connected to the GPS receiver by a communication link. The control circuit calculates an average SNR of the plurality of signals and compares the average SNR to a threshold SNR. In one example the threshold SNR varies depending upon a number of satellites sending the plurality of signals and a speed at which the marine vessel is traveling.

30 Claims, 6 Drawing Sheets

Number of Satellites

| | 0 | 4 | 6 | 8 | 10 | 12 |
|---|---|---|---|---|---|---|
| 0 | 100.00 | 40.00 | 38.2 | 36.5 | 34.75 | 33.00 |
| 6 | 100.00 | 38.00 | 34.5 | 31.00 | 30.47 | 29.93 |
| 12 | 100.00 | 36.00 | 32.7 | 29.90 | 28.38 | 26.87 |
| 18 | 100.00 | 35.33 | 32.9 | 29.90 | 26.85 | 23.80 |
| 24 | 100.00 | 34.67 | 32.8 | 29.90 | 26.55 | 23.40 |
| 30 | 100.00 | 34.00 | 32.7 | 29.90 | 26.25 | 23.00 |

SOG (row labels)

SYSTEMS AND METHODS OF MONITORING THE ACCURACY OF A GLOBAL POSITIONING SYSTEM RECEIVER IN A MARINE VESSEL

FIELD

The present disclosure relates to global positioning systems and more specifically systems and methods of monitoring the accuracy of global positioning system (GPS) receivers in a marine vessel.

BACKGROUND

U.S. patent application Ser. No. 12/431,035, filed Apr. 28, 2009, is hereby incorporated herein by reference and discloses methods for monitoring the operability of a GPS receiver in order to determine, or verify, the validity of global positioning satellite signals being received by the receiver.

U.S. Pat. No. 7,305,928, issued Dec. 11, 2007, is hereby incorporated herein by reference and discloses vessel positioning systems that maneuver a marine vessel in such a way that the vessel maintains its global position and heading in accordance with a desired position and heading selected by the operator of the marine vessel.

U.S. Pat. No. 7,267,068, issued Sep. 11, 2007, is hereby incorporated herein by reference and discloses systems wherein a marine vessel is maneuvered by independently rotating first and second marine propulsion devices about their respective steering axes in response to commands received from a manually operable control device, such as a joystick. The marine propulsion devices are aligned with their thrust vectors intersecting a point on a centerline of the marine vessel and, when no rotational movement is commanded, at the center of gravity of the marine vessel.

U.S. Pat. No. 6,485,341, issued Nov. 26, 2002, is hereby incorporated herein by reference and discloses methods for controlling the average speed of a vehicle over a time period or distance length and includes selecting a desired average speed, measuring an actual speed, and maintaining a cumulative error determined as a function of the difference between the average speed and actual speed at the time over which the actual speed measurement was taken.

U.S. Pat. No. 6,273,771, issued Aug. 14, 2001, is hereby incorporated herein by reference and discloses control systems for a marine vessel that incorporate a marine propulsion system that can be attached to a marine vessel and connected in signal communication with a serial communication bus and controller.

GPS receivers are commonly utilized to calculate and provide a current global position of a marine vessel. The global position is communicated to a control system, which automatically controls operation of a propulsion system of the vessel based upon the global position. This allows the control system to, for example, maintain a desired global position of the vessel or maintain a heading and/or speed of travel of the vessel.

Those having ordinary skill in the art of GPS receivers and control systems for the marine vessels understand that from a plurality of GPS signals received from GPS satellites, a microprocessor in the GPS receiver is able to calculate and provide to the control system: the longitude and latitude where the GPS receiver is located, the speed over ground (SOG) and the course over ground (COG) of the GPS receiver (and by association the SOG and COG of the marine vessel in which the GPS receiver is located), and the number of and location of the GPS satellites in terms of, for example, relative distance and azimuth from the GPS receiver. In some cases the GPS receiver is also able to calculate and provide to the control system the horizontal dilution of precision (HDOP) of the plurality of GPS signals. HDOP is a standard GPS accuracy metric that is largely based upon the geometric position of the satellites being used by the GPS receiver.

SUMMARY

The present disclosure stems from the inventors' research and development of improved systems and methods for increasing the reliability of data used to determine global positions of marine vessels. The present inventors have recognized that horizontal dilution of precision (HDOP) is not always an effective accuracy metric of global position data, especially in cases where the global position system (GPS) receiver is partially obstructed such that it is not receiving full strength signals from the GPS satellites. Specifically, HDOP does not account for the quality of the signal received from each GPS satellite, which is typically measured by signal to noise ratio (SNR). GPS calculations based on signals having a poor SNR can be inaccurate, which in turn can lead to decreased control system performance on the marine vessel. Utilizing HDOP as the sole accuracy metric does not effectively identify GPS receiver accuracy in all situations that may occur during marine vessel operation.

During their research and development, the inventors invented improved systems and methods of monitoring the accuracy of global positioning system (GPS) receivers in marine vessels, which are described and depicted in this disclosure.

In one example, a method comprises: receiving a plurality of satellite signals; calculating a global position of a GPS receiver based on the plurality of satellite signals; determining an SNR of each of the plurality of satellite signals; providing a control circuit having a computer readable medium having executable code; calculating with the control circuit an average SNR of the plurality of satellite signals; and comparing with the control circuit the average SNR to a threshold SNR. Optionally, the threshold SNR varies depending upon the number of satellites sending the plurality of signals and the speed at which the marine vessel is traveling. Further optionally, the average SNR is weighted based upon the location of each satellite sending the plurality of satellite signals relative to the GPS receiver, wherein the location of each satellite is defined by at least one of the elevation and the azimuth of each satellite relative to the GPS receiver. Further optionally, the method comprises displaying an alert on a display based upon the comparison of the average SNR to the threshold SNR.

The monitoring of accuracy of the GPS receiver by comparing average SNR to a threshold SNR can occur in conjunction with a method that comprises calculating a horizontal dilution of precision (HDOP) and comparing the calculated HDOP to a threshold HDOP. In this example, the threshold HDOP can vary based upon speed at which the marine vessel is traveling. Optionally, the method comprises displaying an alert on a display based upon the comparison. For example, the method can include displaying an alert when either the calculated HDOP is above the threshold HDOP or the average SNR is below the threshold SNR, and not displaying an alert when the calculated HDOP is equal to or below the threshold HDOP and the calculated SNR is equal to or above the threshold SNR. In another example, the alert can be displayed when either the calculated HDOP is equal to or above the threshold HDOP or the average SNR is equal to or below the threshold SNR, and the alert is not displayed when the calculated HDOP is below the threshold HDOP and the average SNR is above the threshold SNR. Further comparison methods of this type are contemplated.

Further optionally, the method comprises altering with the control circuit an operational mode of a propulsion device on the marine vessel based upon the comparison of the average SNR to the threshold SNR. The operational mode can comprise at least one of a stationkeeping mode, an autoheading mode, and a waypoint tracking mode. Altering of the operational mode can include disabling the mode, or modifying the mode in some manner, such as for example modifying control gains to handle reduced GPS receiver accuracy.

Systems for monitoring the accuracy of a global positioning system (GPS) receiver in a marine vessel are also provided. In one example, the systems comprise: a GPS receiver receiving a plurality of satellite signals, calculating a global position of the GPS receiver based on the plurality of signals, and determining a signal to noise ratio (SNR) of each signal in the plurality of signals; and a control circuit having a computer readable medium having executable code, and being connected to the GPS receiver by a communication link. The control circuit calculates an average SNR of the plurality of signals and compares the average SNR to a threshold SNR. In some examples the GPS receiver identifies a number of satellites sending the plurality of satellite signals, and the threshold SNR varies depending upon the number of satellites. Optionally the threshold SNR varies depending upon speed at which the marine vessel is traveling.

Further examples are described herein below and would also be apparent from this disclosure to those having ordinary skill in the art.

DETAILED DESCRIPTION OF THE FIGURES

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
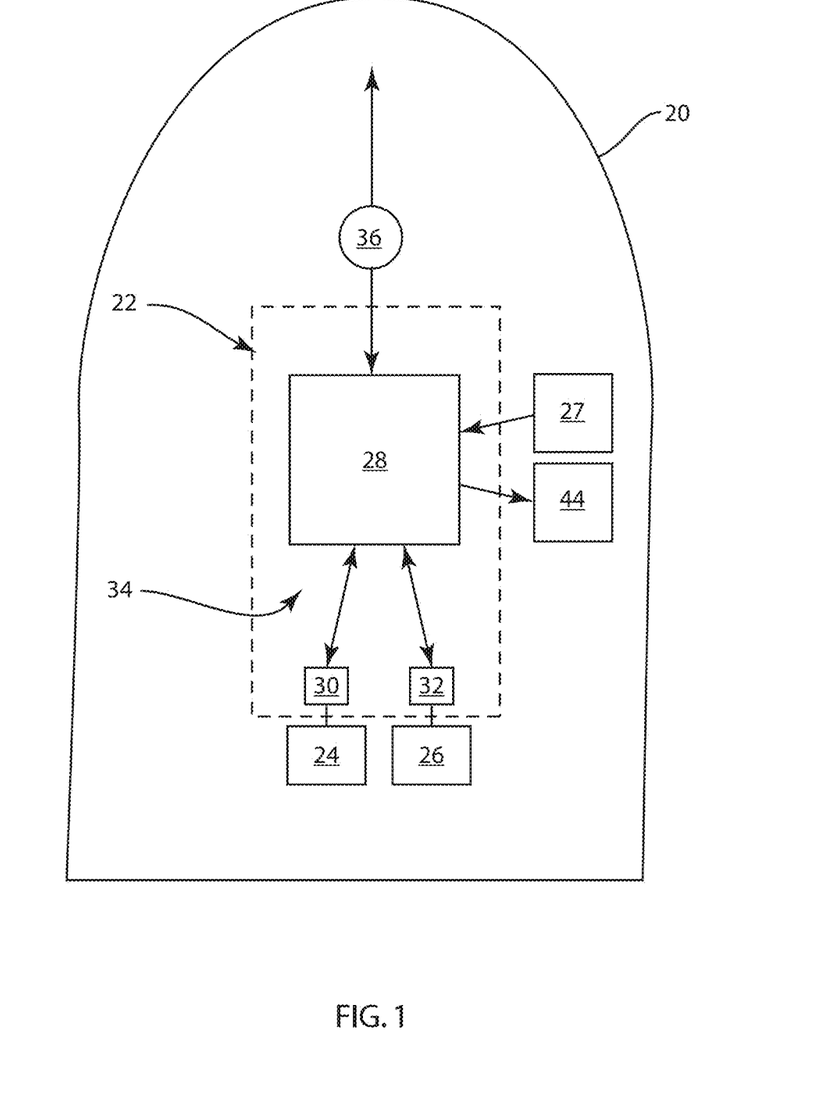
FIG. 1 is a schematic representation of an exemplary marine vessel having a control circuit and a GPS receiver.

FIG. 1 is a schematic depiction of a marine vessel 20 having propulsion devices 24, 26 configured to provide propulsive force and thus move the marine vessel 20 in a certain direction and at a certain speed. The size, type and configuration of marine vessel 20 and propulsion devices 24, 26 can vary from that shown and described. The marine vessel 20 can embody, for example, a personal watercraft, jet boat, speed boat, fishing boat, luxury watercraft and/or the like. The propulsion devices 24, 26 can embody, internal combustion engines, electric motors, hybrid systems, and/or the like. The propulsion devises 24, 26 can be configured as one or more inboard drives, outboard drives, inboard/outboard drives, stern drives, and/or the like. Further, the propulsion device(s) can include one or more propellers, impellers, pod drives, and/or the like. The number of and location of marine propulsion devices can vary from what is shown and described.

The propulsion devices 24, 26 are controlled by a control circuit 22 having computer readable medium and executable code. The type of control circuit 22 can vary from what is shown and described. In the example shown, the control circuit 22 includes a command control section 28 and propulsion device control sections 30, 32 that are connected together by a network 34, which in the example shown is a computer area network (CAN). Other examples of the control circuit 22 can embody a non-CAN-based network that functions based upon discrete analog inputs.

The control circuit 22 is configured to receive an operational command input by an operator via an input device 27, which can for example include a joystick, keypad, touch screen, steering wheel, shift/throttle lever, and/or the like. The control circuit 22 is also programmed to operate the marine propulsion devices 24, 26 to move the marine vessel 20, in accordance with the operational command from the input device 27. These types of input devices and control circuit configurations for marine vessels, examples of which are provided in the above-referenced U.S. patents incorporated herein by reference, are well known to those having ordinary skill in the art.

Referring to FIG. 1, at least one GPS receiver 36 is configured to receive a plurality of signals from GPS satellites and calculate a current global position of the marine vessel 20. The GPS receiver 36 can have its own microprocessor having computer readable medium and executable code. The number of GPS receivers 36 can be more than one. An example of a suitable GPS receiver is the Maretron GPS200; however other types of GPS receivers are available and would work with the systems and methods described herein. The GPS receiver 36 is also configured to calculate a signal to noise ratio (SNR) of each signal in the plurality of signals, thus identifying the relative strength of the signal that is received. Further, the GPS receiver 36 is configured to calculate the current speed over ground (SOG) and course over ground (COG) of the marine vessel 10. Further, the GPS receiver is configured to determine the number of satellites being used in the calculations of the GPS receiver 36 and the location of each GPS satellite relative to the GPS receiver in terms of azimuth and elevation. Further, the GPS receiver is configured to calculate the horizontal dilution of precision (HDOP) of the satellite signals, which is an accuracy metric for determining the accuracy of the fix calculation made by the GPS receiver. HDOP is well known to those having ordinary skill in the art and is based, in part, on the number of and geometric position of the satellites used in the fix calculation. In an alternate arrangement, the command control section 28 or other control device can be configured to perform any or all of the calculations and/or functions described above as being performed by the GPS receiver 36.

From the GPS receiver 36, the control circuit 22 receives various data including the calculated global position, the SNR of each signal in the plurality of signals, the SOG and the COG of the marine vessel 10, and HDOP. Based upon this information, the control circuit 22 is programmed to operate the marine propulsion devices 24, 26 according to at least one operational mode. The operational mode can include, for example, a stationkeeping mode wherein the control circuit 22 controls the propulsion devices 24, 26 to maintain a selected or current global position of the marine vessel 20; an autoheading mode wherein the control circuit 22 controls the propulsion devices 24, 26 to maintain a selected or current heading of the marine vessel 20; or a waypoint tracking mode wherein the control circuit 22 controls the propulsion devices 24, 26 to move the marine vessel 20 to one or more or selected global positions. The type of mode operated by the control circuit 22 is not critical and can vary from what is shown and described. This type of GPS receiver and control circuit configuration is well known to those having ordinary skill in the art. Examples of this type of configuration are provided in the above-referenced U.S. patent application and U.S. patents, which are incorporated herein by reference.

The control circuit 22 is also configured to display on a display 44 information regarding the current global position of the marine vessel 20. This information can include the HDOP, thereby in some instances allowing the operator to understand the accuracy of the global position calculated by the GPS receiver 36. The type of display can vary and is not critical. This type of control circuit 22 and display 44 configuration is well known to those having ordinary skill in the art. Examples of this type of configuration are provided in the above-referenced U.S. patent application, which is incorporated herein by reference.

During research and development, the present inventors have realized that because HDOP does not take into account the quality of signal from each GPS satellite, it does not effectively provide a metric of the accuracy of the GPS fix calculation in all circumstances. For example, HDOP does not effectively indicate GPS receiver accuracy when the GPS fix calculation is partially obstructed such that it is not receiving full strength signals from the GPS satellite. HDOP does not account for the quality of the signal received from each GPS satellite, which is typically measured by signal to noise ratio (SNR). GPS receiver calculations based on signals having a poor SNR can be inaccurate, which in turn can lead to decreased marine vessel control system performance.

Figure 2:
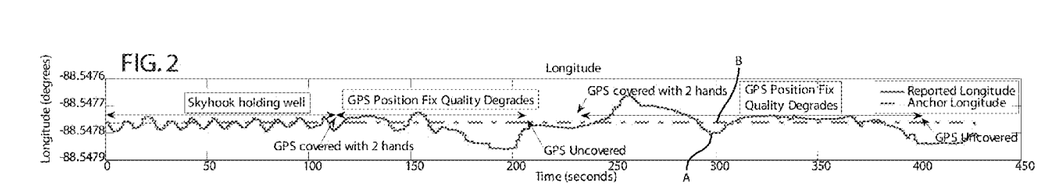
FIG. 2 is a graphical representation of longitude of the marine vessel over a certain time period.
Figure 3:
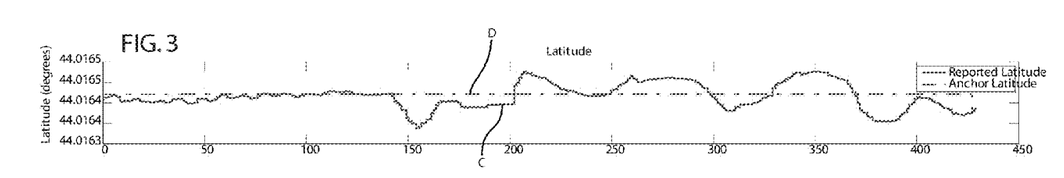
FIG. 3 is a graphical representation of latitude of the marine vessel over the time period.
Figure 4:
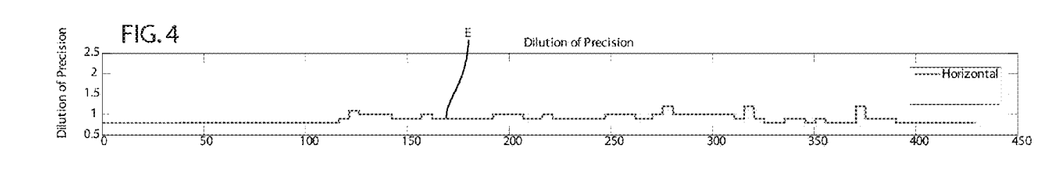
FIG. 4 is a graphical representation of HDOP of the GPS receiver over the time period.

FIGS. 2-6 exemplify global positioning characteristics of the marine vessel 10 in stationkeeping mode over a time period of 450 seconds. Referring to FIG. 2, the solid line A depicts the longitude of the marine vessel 20 (Reported Longitude) reported by the GPS receiver 36 over the time period. The dashed line B depicts the longitude of the marine vessel 20 (Anchor Longitude) that is requested by stationkeeping mode of the control circuit 22 over the time period. Referring to FIG. 3, the solid line C depicts the latitude of the marine vessel 20 (Reported Latitude) reported by the GPS receiver 36 over the time period. The dashed line D depicts the latitude of the marine vessel 20 (Anchor Latitude) that is requested by stationkeeping mode of the control circuit 22 over the time period. Referring to FIG. 4, the solid line E depicts the horizontal dilution of precision (HDOP) calculated by the GPS receiver 36 over the time period.

At about 110 seconds into the time period, the GPS receiver 36 was covered with two hands so as to partially block the satellite signals received by the GPS receiver 36. At about 210 seconds into the time period, the GPS receiver 36 was uncovered. At about 230 seconds into the time period, the GPS receiver 36 was again covered with two hands so as to partially block the satellite signals received by the GPS receiver 36. At about 400 seconds into the time period, the GPS receiver 36 was again uncovered.

From FIG. 4, it can be seen that the action of covering and uncovering the GPS receiver had relatively little impact on the HDOP value, which only varied between approximately 1 and 1.5 throughout the time period. HDOP values of 1-2 are generally considered to be an excellent fix. However from FIGS. 2 and 3, it can be seen that the action of covering and uncovering the GPS receiver 36 caused the actual GPS receiver position fix quality to degrade significantly. Consequently, as the actual GPS receiver position fix quality degrades, the control circuit 22 inaccurately controls the marine propulsion devices 24, 26 to move the vessel 20 out of the actual desired GPS position shown in FIGS. 2 and 3. This is illustrated by the deviation of the solid lines A and C from the dashed lines B and D in FIGS. 2 and 3, respectively. FIGS. 2-4 therefore demonstrate that accurate reporting of HDOP during the time period when the GPS receiver 36 is partially blocked does not effectively alert the operator that the GPS receiver fix calculation is or may be inaccurate. This can present a dangerous situation where the marine vessel 20 is inaccurately controlled out of a desired position without alerting operators and passengers in the vessel 20 or those individuals that are close to the vessel 20. At a minimum, this prohibits effective and efficient control of the marine vessel 20.

Figure 5:
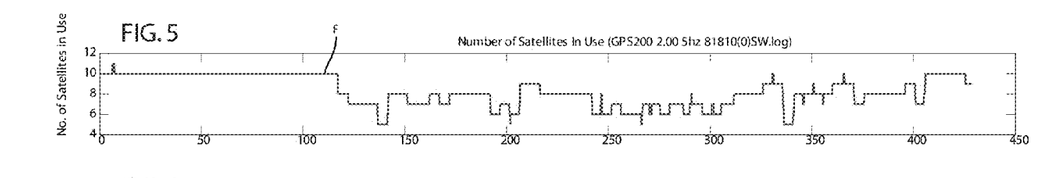
FIG. 5 is a graphical representation of number of satellites in the GPS receiver over the time period.
Figure 6:
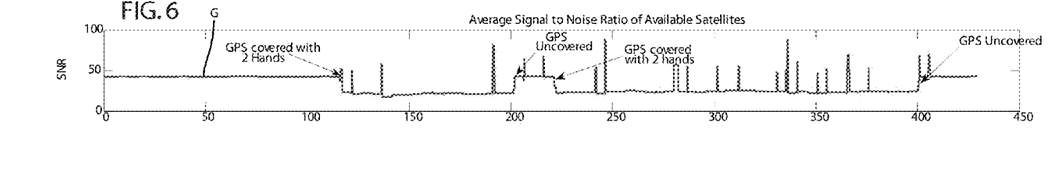
FIG. 6 is a graphical representation of average SNR in the GPS receiver over the time period.

The present inventors have recognized that by monitoring average SNR of the plurality of satellite signals, the accuracy of a global position fix calculated by a partially covered GPS receiver can be determined and monitored. FIG. 5 depicts a solid line F the total number of satellites in use by the GPS receiver 36 over the 450 second time period. As discussed above, this value is provided by the GPS receiver 36. FIG. 6 depicts a solid line G representing the average SNR of the available satellites. This value can be calculated by the control circuit 22 upon receiving the individual SNR values of the signals received by the GPS receiver 36. From FIG. 6 it can be seen that the average SNR value varies significantly when the GPS receiver 36 is covered as compared to when the GPS receiver 36 is uncovered. Specifically, the average SNR drops from about 45-50 to about 20-25 when the GPS receiver 36 is covered so that the signals from the GPS satellite are partially blocked.

The present inventors have determined that it would therefore be possible to advantageously provide accuracy metrics that account for reduced satellite signal strength in cases where for example the GPS receiver 36 is partially blocked.

Figure 7:
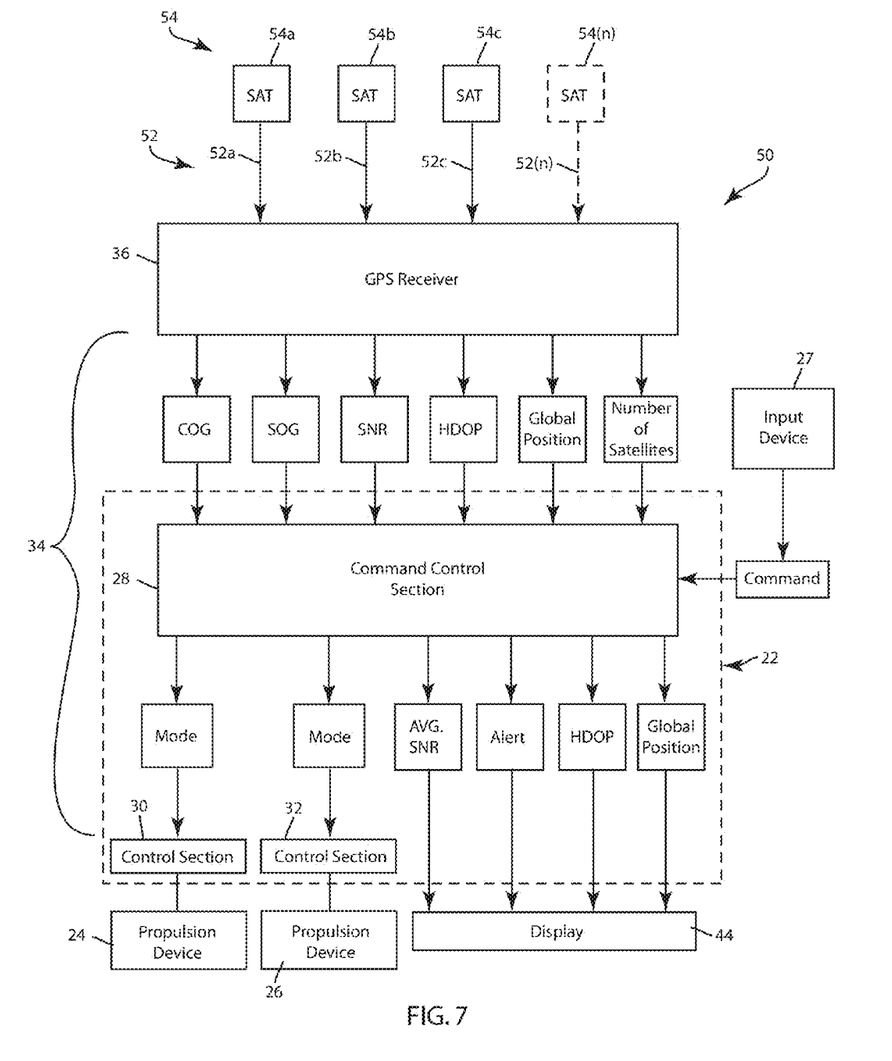
FIG. 7 is a schematic representation of an exemplary control system for a marine vessel.

FIG. 7 is a schematic representation of an exemplary control system 50 for a marine vessel 20. The control system 50 incorporates a GPS receiver 36, a control circuit 22 having a command control section 28 and at least one propulsion device control section 30, 32. The GPS receiver 36, command control section 28 and propulsion device control sections 30, 32 communicate with each other via control network 34. Command control section 28 also communicates with a display 44 via the control network 34.

The GPS receiver receives a plurality of satellite signals 52 including 52a, 52b, 52c, . . . 52(n) from a plurality of GPS satellites 54 including 54a, 54b, 54c, . . . 54(n). Based upon the plurality of satellite signals 52, the GPS receiver 36 is configured to calculate a global position. The GPS receiver 36 is further configured to determine an SNR for each satellite signal 52a, 52b, 52c, . . . 52(n). In addition, the GPS receiver 36 is configured to calculate the COG and SOG of the marine vessel 20, as well as the number of and location of each of the satellites 54a, 54b, 54c, . . . 54(n). The location can be provided in terms of elevation of the respective satellite to the GPS receiver 36 and azimuth of the respective satellite to the GPS receiver 36.

The command control section 28 has a computer readable medium having executable code and is configured to calculate an average SNR of the plurality of satellite signals 52. In addition, the command control section 28 is configured to monitor the accuracy of the calculated global position of the GPS receiver 36 by comparing the calculated average SNR to a threshold SNR.

The threshold SNR can vary based upon the number of satellites 54a, 54b, 54c, . . . 54(n) in the plurality of satellites 54. In this example, the GPS receiver 36 identifies a number of satellites sending the plurality of satellite signals 52 and communicates this information to the command control section 28. By for example using a lookup table in the command control section 28, a threshold SNR is identified.

The threshold SNR can also or alternately vary depending upon the speed at which the marine vessel 20 is currently traveling. For example, the GPS receiver 36 can be configured to identify the SOG of the marine vessel 20 and communicate this information to the command control section 28. The command control section 28 can then identify the threshold SNR by for example a lookup table. In certain examples, the threshold SNR decreases as the speed at which the marine vessel 20 is traveling increases. This example favorably applies to control systems configured to operate both stationkeeping mode and autoheading or waypoint tracking modes. In these examples, a different accuracy requirement is set for low speed operations, such as stationkeeping mode as compared to higher speed operations, such as autoheading or waypoint tracking modes.

Figure 8:
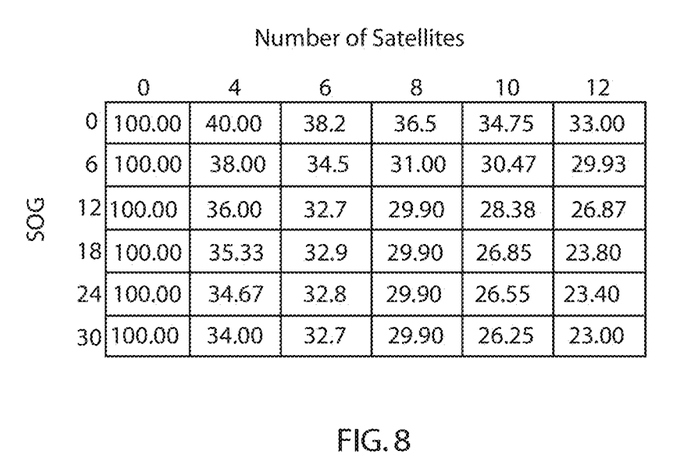
FIG. 8 is a table showing one example of how threshold average SNR values can vary depending upon speed over ground (SOG) of the marine vessel and the number of satellites used to calculate a global position fix.

FIG. 8 depicts one example of a lookup table for threshold SNR. The values shown in FIG. 8 are exemplary and shown for discussion purposes only. The actual threshold SNR values can vary from that shown. Each vertical column represents a number of satellites utilized by the GPS receiver 36 in its global position calculation. Each row denotes an SOG of the marine vessel 20. The first column denoting zero satellites includes average SNR values of 100, which is an unattainable SNR. This is because a GPS receiver 36 cannot calculate a global position fix with anything less than four satellites. The remaining values shown in the table are estimated based upon actual testing conducted by the inventors where the GPS receiver 36 was blocked with various obstructions. The present inventors found that stationkeeping performance of the control system 50 degraded significantly as average SNR approached a value of 30, even when there were ten satellites used in the global position fix calculation. The threshold SNR decreases as the SOG increases because the positional accuracy required for operational modes of the marine vessel 20 such as autoheading mode and waypoint tracking mode do not require the same position accuracy as stationkeeping mode as discussed above.

In a further example, the command control section 28 is configured to calculate a weighted average SNR, wherein different weights are applied to the respective GPS satellites 54a, 54b, 54c, . . . 54(n) sending the plurality of satellite signals 52. For example, the location of each satellite relative to the GPS receiver 36 can be defined by the elevation and azimuth of each satellite 54a, 54b, 54c, . . . 54(n) relative to the GPS receiver 36. Satellites having a more favorable position respective to the GPS receiver 36 would receive greater weight as compared to satellites having a less favorable position.

For example, suppose that five GPS satellites 54a, 54b, 54c, 54d, 54e are utilized by the GPS receiver 36 in its global position fix calculation, with the satellites having the following SNR, elevation, and azimuth relative to the GPS receiver 36.

| Satellite Number | Signal to Noise Ratio (SNR) | Elevation (degrees) $\theta$ | Azimuth (degrees) $\rho$ |
|---|---|---|---|
| 54a | 40 | 0 | 0 |
| 54b | 40 | 0 | 90 |
| 54c | 40 | 0 | 180 |
| 54d | 40 | 0 | 270 |
| 54e | 20 | 90 | 0 |

According to this example, 54a-54d are near the horizon and equally spaced in the cardinal directions. The satellite 54e is positioned directly above (over) the GPS receiver 36. Taking an equally weighted average or mean is accomplished by the following equation:

$$\frac{SNR_1 + SNR_2 + SNR_3 + SNR_4 + SNR_5}{Total\_Sats\_in\_Use} = \frac{(40 + 40 + 40 + 40 + 20)}{5} = 36$$

However, due to the locations of the satellites, satellite 54e has little effect on the positional accuracy (latitude/longitude) of the GPS receiver 36 since it is located directly above the GPS receiver 36. Therefore, an equally weighted mean can skew the resulting estimate.

Conversely, a non-equally weighted mean takes into account the position of the satellites with respect to the GPS receiver 36 and thus more accurately estimates the quality of the global position fix. An example of an unequally weighted mean can be:

$$\frac{1}{\cos(\theta_1) + \cos(\theta_2) + \cos(\theta_3) + \cos(\theta_4) + \cos(\theta_5)} * \sum_{n=1}^{5} SNR_n * \cos(\theta_n) =$$
$$\frac{1}{4} * (40 + 40 + 40 + 40 + 0) = 40$$

This unequally weighted mean thus better represents the true effect that the poor SNR of satellite 54e would have on the accuracy of the global position fix calculated by the GPS receiver 36.

The command control section 28 is further configured to communicate with and control operation of the display 44 to display the determined accuracy of the calculated global position of the GPS receiver 36. For example, the display 44 can be controlled to display an alert based upon a comparison of the accuracy of the calculated global position of the GPS receiver 36 to a value. Further, the command control section 28 can cause the display 44 to display a calculated global position of the GPS receiver 36 and the calculated average SNR.

In another example, the command control section 28 can be configured to monitor the accuracy of the calculated global position of the GPS receiver 36 by comparing the HDOP calculated by the GPS receiver 36 to a threshold HDOP. Again, the threshold HDOP can vary based upon the speed at which the marine vessel 20 is traveling. In this instance, the command control section 28 can control the display 44 to display an alert when either the calculated HDOP is above the threshold HDOP or the calculated SNR is also below the threshold SNR. This dual-stage check for accuracy provides increased reliability and accounts for situations where the GPS receiver 36 is partially obstructed.

In a further example, the command control section 28 can be configured to automatically control or alter an operational mode of one or more of the propulsion devices 24, 26 on the marine vessel 20 based upon the determined accuracy of the calculated global position of the GPS receiver 36. Such operational modes, as discussed above, can include for example stationkeeping mode, autoheading, or waypoint tracking mode. Depending upon the comparison of average SNR to the threshold SNR and/or the comparison of the calculated HDOP to the threshold HDOP, the command control section 28 can be configured to send control signals via the network 34 to the control sections 30, 32 of the propulsion devices 24, 26. This allows the command control section 28 to control operation of the propulsion devices 24, 26 based upon the data received from the GPS receiver 36. The command control section 28 can alter the operational mode by disabling the mode or by modifying the mode. For example, control gains could be reduced to minimize the effect of the lower GPS receiver accuracy.

Figure 9:
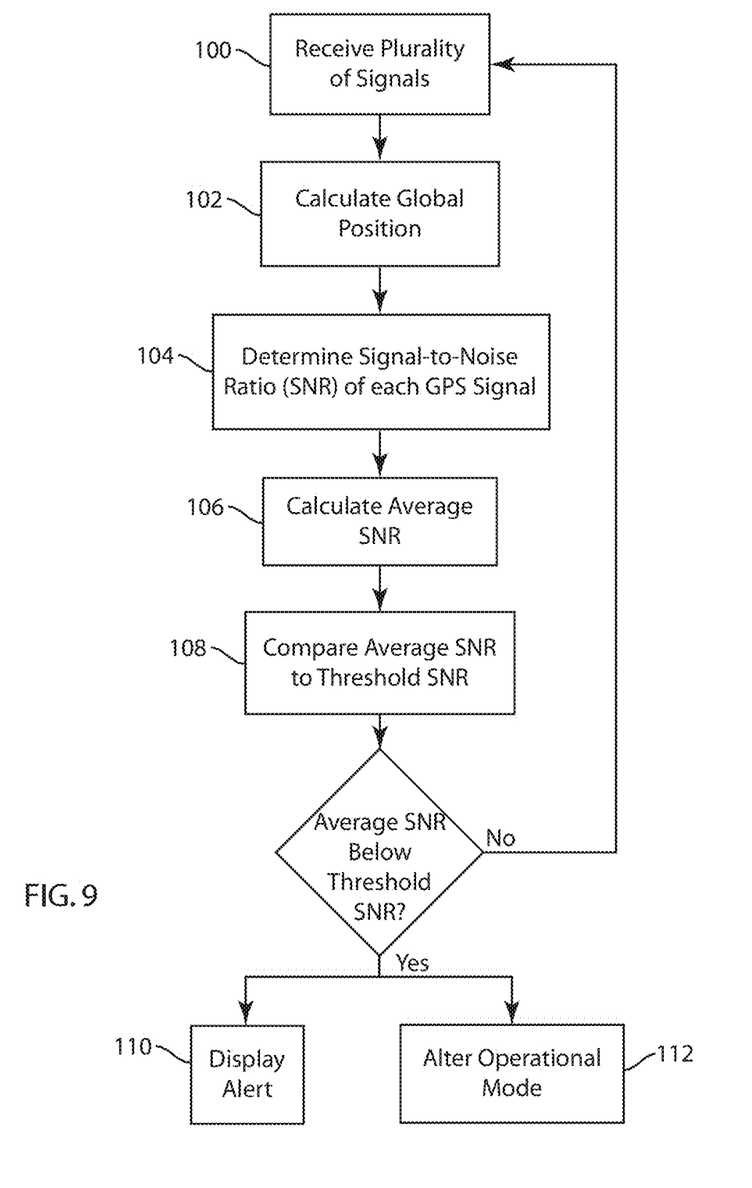
FIG. 9 is a flow chart showing one example of a method of monitoring the accuracy of a GPS receiver in a marine vessel.

FIG. 9 depicts one example of a method of monitoring the accuracy of GPS receiver in a marine vessel. At step 100, a GPS receiver receives a plurality of GPS satellite signals. At step 102, the GPS receiver calculates a global position of the GPS receiver based on the plurality of satellite signals received in step 100. At step 104, the GPS receiver determines the SNR of each of the plurality of satellite signals. At step 106 a command control section calculates an average SNR for the satellite signals received at step 100. At step 108, the command control section compares the average SNR to a threshold SNR. If the average SNR is not below the threshold SNR, the method begins again at step 100. If the average SNR is below the threshold SNR, the command control section optionally displays an alert at step 110 and/or alters an operational mode of the marine vessel 20 at step 112.

Figure 10:
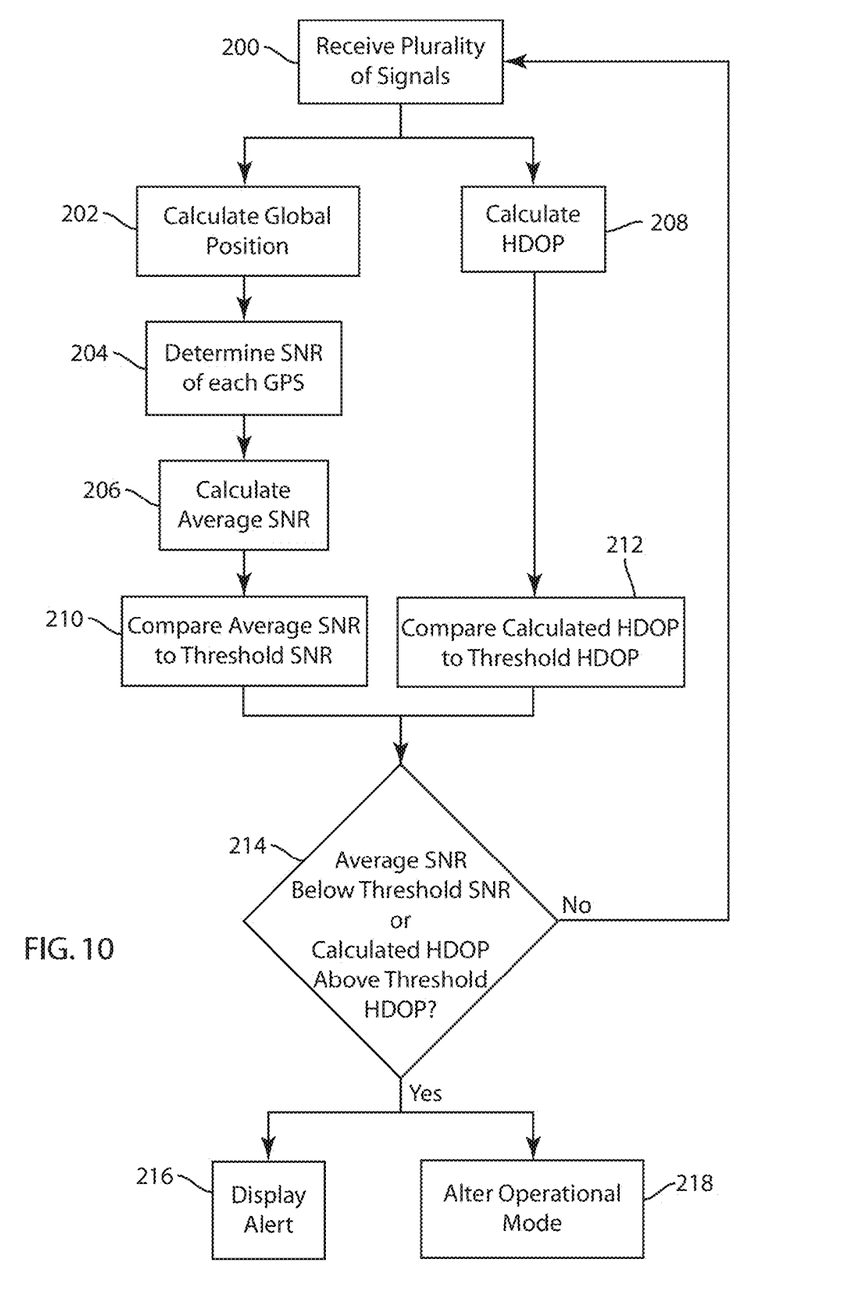
FIG. 10 is a flow chart showing another example of a method of monitoring the accuracy of a GPS receiver in a marine vessel.

FIG. 10 depicts another example of a method of monitoring the accuracy of a GPS receiver in a marine vessel. At step 200, the GPS receiver receives a plurality of GPS satellite signals. At step 202, the GPS receiver calculates a global position based on the plurality of satellite signals. At step 204, the GPS receiver determines an SNR of each of the plurality of satellite signals. At step 206, the command control section 28 calculates an average SNR of the plurality of satellite signals. At step 208, the command control section calculates the HDOP of the plurality of signals. At step 210, the command control section compares the calculated average SNR to a threshold SNR. At step 212, the command control section compares the calculated HDOP to a threshold HDOP. At step 214, if the average SNR is not below the threshold SNR or the calculated HDOP is not above the threshold HDOP, the method begins again at step 200. Conversely, if either the average SNR is below the threshold SNR or the calculated HDOP is above the threshold HDOP, the command control section optionally controls the display at step 216 to display an alert to the operator and/or controls the propulsion devices at step 218 to alter an operational mode of the marine vessel.

As described above, the threshold SNR can vary depending on the number of satellites identified by the GPS receiver and/or upon the speed at which the marine vessel is traveling, as identified by the GPS receiver. Further the average SNR can be calculated as a weighted average based upon the location of each satellite sending the plurality of satellite signals, for example based upon the elevation and azimuth of each satellite relative to the GPS receiver. Similarly, the threshold HDOP can vary based upon the speed at which the marine vessel is traveling.

It will thus be seen that the present disclosure provides systems and methods for monitoring the accuracy of a global positioning system receiver that include means for receiving a plurality of satellite signals, calculating a global position of the GPS receiver based on the plurality of signals, and determining a signal to noise ratio (SNR) of each signal in the plurality of signals. Means are also provided for calculating an average SNR of the plurality of signals and determining the accuracy of the calculated global position of the GPS receiver by comparing the average SNR to a threshold SNR.

What is claimed is:

1. A method of monitoring the accuracy of a global positioning system (GPS) receiver in a marine vessel, the method comprising:
   receiving a plurality of satellite signals;
   calculating a global position of the GPS receiver based on the plurality of satellite signals;
   determining a signal to noise ratio (SNR) of each of the plurality of satellite signals;
   providing a control circuit having a computer readable medium having executable code;
   calculating with the control circuit an average SNR of the plurality of satellite signals:
   comparing with the control circuit the average SNR to a threshold SNR; and
   identifying a number of satellites sending the plurality of satellite signals, wherein the threshold SNR varies depending upon the number of satellites.

2. The method according to claim 1, wherein the average SNR is a weighted average.

3. The method according to claim 1, comprising displaying an alert on a display if the average SNR is below the threshold SNR.

4. The method according to claim 1, comprising calculating a horizontal dilution of precision (HDOP) and further comparing the calculated HDOP to a threshold HDOP.

5. The method according to claim 1, comprising altering with the microprocessor an operational mode of a propulsion device on the marine vessel based upon the comparison of the average SNR to the threshold SNR.

6. The method according to claim 5, wherein the operational mode comprises at least one of a stationkeeping mode, an autoheading mode, and a waypoint tracking mode.

7. A method of monitoring the accuracy of a global positioning system (GPS) receiver in a marine vessel, the method comprising:
   receiving a plurality of satellite signals;
   calculating a global position of the GPS receiver based on the plurality of satellite signals;
   determining a signal to noise ratio (SNR) of each of the plurality of satellite signals;
   providing a control circuit having a computer readable medium having executable code;
   calculating with the control circuit an average SNR of the plurality of satellite signals;
   comparing with the control circuit the average SNR to a threshold SNR; and identifying a speed at which the marine vessel is traveling, wherein the threshold SNR varies depending upon speed at which the marine vessel is traveling.

8. The method according to claim 7, wherein the threshold SNR decreases when the speed at which the marine vessel is traveling increases.

9. The method according to claim 7, comprising displaying an alert on a display if the average SNR is below the threshold SNR.

10. The method according to claim 7, comprising altering with the control circuit an operational mode of a propulsion device on the marine vessel based upon the comparison of the average SNR to the threshold SNR.

11. A method of monitoring the accuracy of a global positioning system (GPS) receiver in a marine vessel, the method comprising:
  receiving a plurality of satellite signals;
  calculating a global position of the GPS receiver based on the plurality of satellite signals;
  determining a signal to noise ratio (SNR) of each of the plurality of satellite signals;
  providing a control circuit having a computer readable medium having executable code;
  calculating with the control circuit an average SNR of the plurality of satellite signals; and
  comparing with the control circuit the average SNR to a threshold SNR;
  wherein the threshold SNR varies depending upon a number of satellites sending the plurality of signals and a speed at which the marine vessel is traveling.

12. A method of monitoring the accuracy of a global positioning system (GPS) receiver in a marine vessel, the method comprising:
  receiving a plurality of satellite signals;
  calculating a global position of the GPS receiver based on the plurality of satellite signals;
  determining a signal to noise ratio (SNR) of each of the plurality of satellite signals;
  providing a control circuit having a computer readable medium having executable code;
  calculating with the control circuit an average SNR of the plurality of satellite signals; and
  comparing with the control circuit the average SNR to a threshold SNR;
  wherein the average SNR is a weighted average;
  wherein the average SNR is weighted based upon a location of each satellite sending the plurality of satellite signals.

13. The method according to claim 12, wherein the location of each satellite relative to the GPS receiver is defined by at least one of the elevation and the azimuth of each satellite relative to the GPS receiver.

14. A method of monitoring the accuracy of a global positioning system (GPS) receiver in a marine vessel, the method comprising:
  receiving a plurality of satellite signals;
  calculating a global position of the GPS receiver based on the plurality of satellite signals;
  determining a signal to noise ratio (SNR) of each of the plurality of satellite signals;
  providing a control circuit having a computer readable medium having executable code;
  calculating with the control circuit an average SNR of the plurality of satellite signals;
  comparing with the control circuit the average SNR to a threshold SNR; and
  calculating a horizontal dilution of precision (HDOP) and further comparing the calculated HDOP to a threshold HDOP;
  wherein the threshold HDOP varies based upon speed at which the marine vessel is traveling.

15. The method according to claim 14, displaying an alert on a display when either the calculated HDOP is above the threshold HDOP or the average SNR is below the threshold SNR, and not displaying an alert when the calculated HDOP is not above the threshold HDOP and the average SNR is not below the threshold SNR.

16. A system for monitoring the accuracy of a global positioning system (GPS) receiver in a marine vessel, the system comprising:
  a GPS receiver receiving a plurality of satellite signals, calculating a global position of the GPS receiver based on the plurality of signals, and determining a signal to noise ratio (SNR) of each signal in the plurality of signals; and
  a control circuit having a computer readable medium having executable code, and being connected to the GPS receiver by a communication link;
  the control circuit calculating an average SNR of the plurality of signals and comparing the average SNR to a threshold SNR;
  wherein the GPS receiver identifies a number of satellites sending the plurality of satellite signals, and wherein the threshold SNR varies depending upon the number of satellites.

17. The system according to claim 16, wherein the average SNR is a weighted average.

18. The system according to claim 16, comprising a display displaying the an alert based upon a comparison of the average SNR to the threshold SNR.

19. The system according to claim 16, wherein the GPS receiver calculates a horizontal dilution of precision (HDOP) and wherein the control circuit further monitors the accuracy of the calculated global position of the GPS receiver by comparing the calculated HDOP to a threshold HDOP.

20. The system according to claim 19, comprising a display displaying an alert when either the calculated HDOP is above the threshold HDOP or the calculated SNR is below the threshold SNR.

21. The system according to claim 16, wherein the control circuit alters an operational mode of a propulsion device on the marine vessel based upon the comparison of the average SNR to the threshold SNR.

22. The system according to claim 21, wherein the operational mode comprises at least one of a stationkeeping mode, an autoheading mode and a waypoint tracking mode.

23. A system for monitoring the accuracy of a global positioning system (GPS) receiver in a marine vessel, the system comprising:
  a GPS receiver receiving a plurality of satellite signals, calculating a global position of the GPS receiver based on the plurality of signals, and determining a signal to noise ratio (SNR) of each signal in the plurality of signals; and
  a control circuit having a computer readable medium having executable code, and being connected to the GPS receiver by a communication link;
  the control circuit calculation an average SNR of the plurality of signals and comparing the average SNR to a threshold SNR;
  wherein the threshold SNR varies depending upon speed at which the marine vessel is traveling.

24. The system according to claim 23, wherein the threshold SNR decreases when speed at which the marine vessel is traveling increases.

25. The system according to claim 23, comprising a display displaying an alert when either the calculated HDOP is above the threshold HDOP or the calculated SNR is below the threshold SNR.

26. The system according to claim 23, wherein the control circuit alters an operational mode of a propulsion device on the marine vessel based upon the comparison of the average SNR to the threshold SNR.

27. The system according to claim 26, the operational mode comprises at least one of a stationkeeping mode, an autoheading mode and a waypoint tracking mode.

28. A system for monitoring the accuracy of a global positioning system (GPS) receiver in a marine vessel, the system comprising:
- a GPS receiver receiving a plurality of satellite signals, calculating a global position of the GPS receiver based on the plurality of signals, and determining a signal to noise ratio (SNR) of each signal in the plurality of signals; and
- a control circuit having a computer readable medium having executable code, and being connected to the GPS receiver by a communication link;
- the control circuit calculating an average SNR of the plurality of signals and comparing the average SNR to a threshold SNR;
- wherein the average SNR is a weighted average; and
- wherein the average SNR is weighted based upon a location of each satellite sending the plurality of satellite signals.

29. The system according to claim 28, wherein the location of each satellite relative to the GPS receiver is defined by at least one of the elevation and the azimuth of each satellite relative to the GPS receiver.

30. A system for monitoring the accuracy of a global positioning system (GPS) receiver in a marine vessel, the system comprising:
- a GPS receiver receiving a plurality of satellite signals, calculating a global position of the GPS receiver based on the plurality of signals, and determining a signal to noise ratio (SNR) of each signal in the plurality of signals; and
- a control circuit having a computer readable medium having executable code, and being connected to the GPS receiver by a communication link;
- the control circuit calculating an average SNR of the plurality of signals and comparing the average SNR to a threshold SNR;
- wherein the GPS receiver calculates a horizontal dilution of precision (HDOP) and wherein the control circuit further monitors the accuracy of the calculated global position of the GPS receiver by comparing the calculated HDOP to a threshold HDOP; and
- wherein the threshold HDOP varies based upon speed at which the marine vessel is traveling.

* * * * *